April 20, 1937. G. B. COOK 2,077,463
MEANS FOR INDICATING THE RATE OF TIME SYSTEMS
Filed Nov. 20, 1934 2 Sheets-Sheet 1

INVENTOR
George B. Cook

April 20, 1937.  G. B. COOK  2,077,463
MEANS FOR INDICATING THE RATE OF TIME SYSTEMS
Filed Nov. 20, 1934  2 Sheets-Sheet 2

INVENTOR
george B. Cook

Patented Apr. 20, 1937

2,077,463

UNITED STATES PATENT OFFICE 2,077,463

MEANS FOR INDICATING THE RATE OF TIME SYSTEMS

George B. Cook, Philadelphia, Pa.

Application November 20, 1934, Serial No. 753,905

4 Claims. (Cl. 200—19)

The invention relates to improvements in stroboscopic devices for making possible the rapid regulation of watches and other time-keeping instruments, with the definite idea of combining extreme accuracy with the utmost simplicity consistent with this accuracy.

It is an object of the present invention to provide improved and relatively inexpensive apparatus for the regulation of watches and other timekeeping devices so that watchmakers, jewelers and other interested persons may avail themselves of it.

It is a further object of this invention to enable a watchmaker to determine the rate of a new hairspring-balance combination before it is placed in the watch, in order to avoid the necessity of removing said combination from the watch for the purpose of correcting a relatively large error which almost invariably exists when new hairsprings are fitted to balances.

The method which this invention employs is stroboscopic, and said invention is not primarily concerned with the use of the well known stroboscopic principle for the objects mentioned in the preceding paragraphs, but with the means, provided by the circuit breaker and its adjusting device, by which each flash of light is limited to an exceedingly short period of time, and also with the means that are used for controlling the frequency of said flashes of light so that this frequency may be accurately varied at will, and also indicated at any desired time.

A scale is provided on which are divisions for indicating the light-flash frequencies which will be obtained when an index or pointer, also provided, is moved to these divisions, or which, instead of indicating these frequencies directly, will bear a definite relationship to said frequencies.

One form of the invention is illustrated in the accompanying drawings wherein:—

Figure 1:
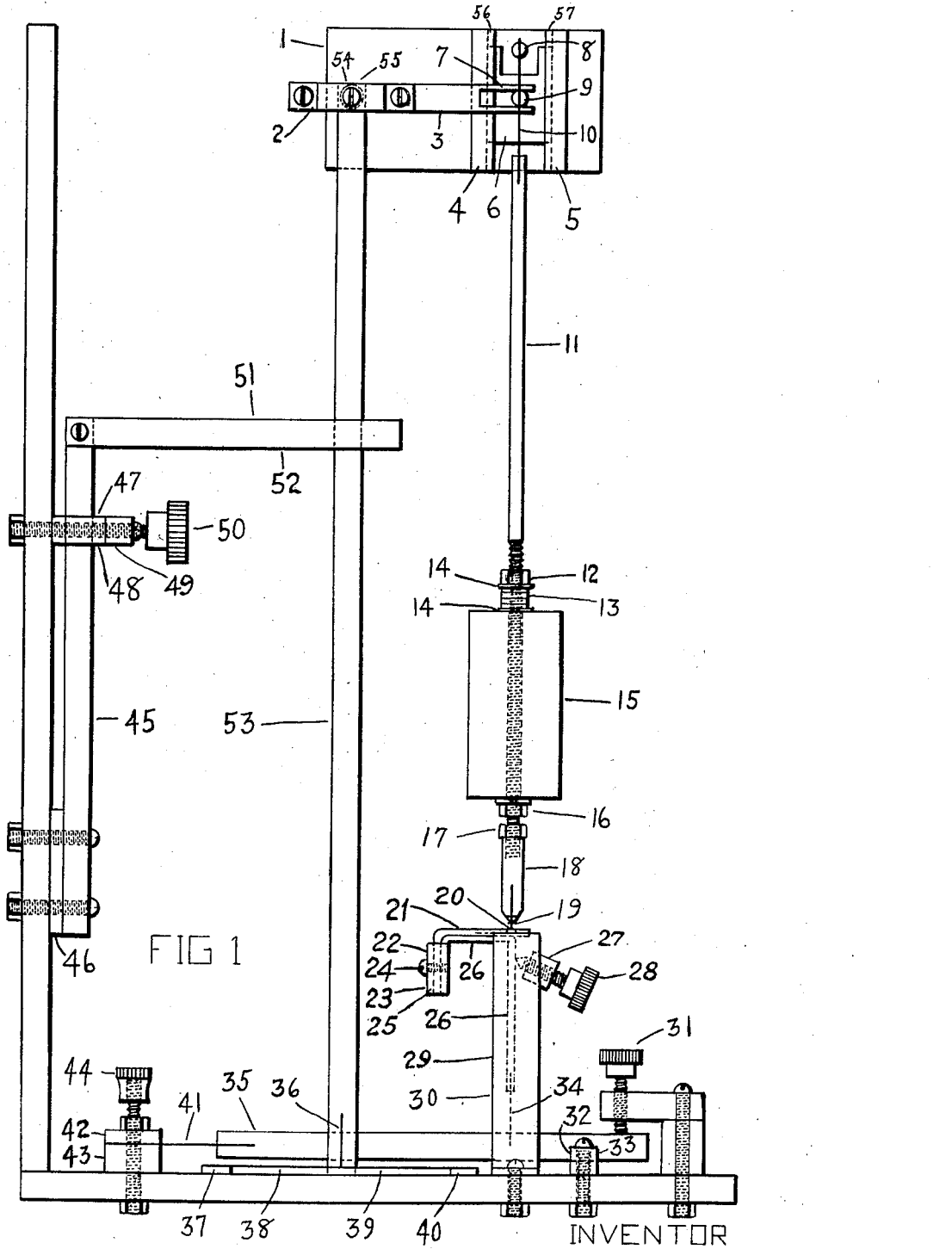
Fig. 1 is a vertical view of the entire portion of the machine to which the invention relates.

Referring to Fig. 1, it will be observed that the apparatus in general consists of a pendulum which may be driven by the usual clockwork mechanism, although this is not absolutely necessary since it will operate, if properly started, under its own momentum for a sufficient time to indicate the rate of a watch or other timekeeping device; means for accurately varying the oscillation frequency of this pendulum, and also a scale for indicating this frequency either directly or indirectly; a device, operated by the pendulum, for closing and opening an electrical circuit; the mechanical design of this device being such that the circuit is closed for an exceedingly short period of time; an adjusting device which makes it possible to accurately control, both vertically and horizontally, the position of the lower contact in relation to the extreme lower end of the upper or pendulum contact, said adjusting device serving to control the period of time during which each light-flash exists.

Figure 2:
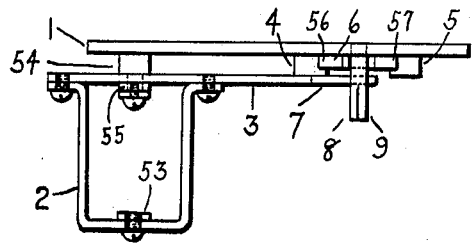
Fig. 2 is a view, as seen from above, of the plate to which are attached the pendulum supporting post, the pendulum regulator slide, and other parts to which later reference is made.
Figure 3:
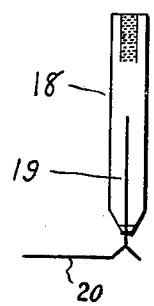
Fig. 3 is an enlarged vertical view of the upper or pendulum contact holder with the upper contact in place, and it also shows the lower contact member in its proper position relative to the upper contact.
Figure 4:
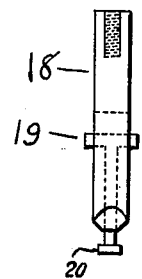
Fig. 4 is a vertical view of the parts that are shown in Fig. 3, but as though it had been rotated, on a vertical axis, through an angle of 90° with the observer looking toward the inverted V shaped end of the lower contact.

Referring to Figs. 1 and 2; 1 is a metal plate to which are attached posts 8, 54, and also vertical guides 4, 5 which have slots 56, 57 in them. A slide, 6, fits smoothly and accurately in these slots or grooves, and a post 9 is attached to this slide. A metal strip 3, having a forked end 7, is attached to post 54. For a short distance from its outer end, post 54 is of smaller diameter than at its base, as shown at 55, and a hole in strip 3 forms a bearing in connection with the outer end of post 55. The forked end 7, of strip 3 fits smoothly over post 9, and in such a manner that there is no lost motion.

It will be seen that when strip 3 is moved back and forth, slide 6, with its post 9, will be moved vertically. A U shaped strip of metal, 2, is attached to the forked strip 3, and a vertical strip 53 is attached to the strip 2. Thus it will be seen that when the strip 53 or regulating arm is moved back and forth, the slide 6 and post 9 will be moved vertically, and with proper fitting, there will be no lost motion. The purpose of the U shaped piece of metal, 2, is to make it possible for the regulating arm 53 to be placed forward of the pendulum bob 15, so that it will not interfere with the motion of the latter.

Referring to Fig. 1, the pendulum assembly consists of a suspension spring 10, which fits into slots in the posts 8 and 9, a rod 11 made preferably of a material having a relatively low thermal coefficient of expansion, such as invar, and a bob 15, preferably of brass, which is held in place by the nuts 12, 16. Between the washers, 14, 14, is a number of felt or other washers of relatively soft material 13. The purpose of these soft washers is to allow for the relatively large expansion and contraction of the bob 15 in comparison with the rod 11 thus permitting temperature compensation of the pendulum and at the same time preventing the slightest change in position of the bob 15 in the event that the pendulum is removed for transportation of the instrument. A change in position of the bob 15 would alter the original, standardized oscillation frequency of the pendulum.

Again referring to Fig. 1, an upper contact holder 18 is fastened to the lower end of the threaded portion of the pendulum rod, and is locked in position by a nut 17. The details of the upper contact holder 18 and the contact 19 are shown more clearly in Figs. 3, 4, 8 and 9.

Figure 8:
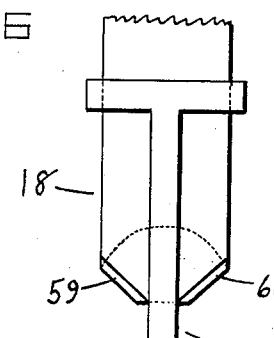
Fig. 8 is a greatly enlarged view of the upper contact, and also the lower portion of the upper contact holder with the half toward the observer removed. It is not precisely the same as a vertical cross-section since the vertical cut or slot actually exists, and is not an imaginary or artificially created one.
Figure 9:
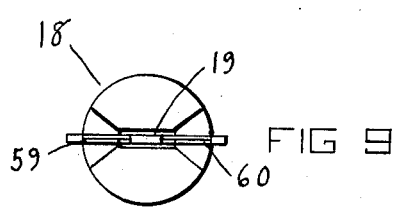
Fig. 9 is a greatly enlarged view of the lower end of the entire upper contact holder with the upper contact in place, and as seen from below.

The lower half of contact holder 18 has a longitudinal slot running through it for the purpose of accommodating the T shaped strip of metal, 19, which serves as the upper contact, said contact fitting tightly into this slot which divides the entire lower half of contact holder 18 into two separate parts. Strips of metal 59, 60 are attached to the lower end of the inside of one of these parts as shown in Figs. 8 and 9, and these strips are made of slightly thinner material than upper contact 19, in order that the two parts or halves which constitute the lower half of contact holder 18 may press firmly against upper contact 19, or in other words, that the contact 19 may remain tightly fitted in its slot. The sole purpose of strips 59 and 60 is to guide the lower end of upper contact and the lower contact holder, and below upper contact holder 18 when contact 19 is inserted into contact holder 18, and also to keep contact 19 in a central position thereafter. As the lower end of contact 19 wears away, it can be lengthened in relation to the extreme end of holder 18 by simply pushing downward on the portions of the upper part of contact 19 which project beyond holder 18.

Immediately below the pendulum are the lower contact and the lower contact holder, and below these is the lower contact adjusting device.

Referring to Fig. 1, 35 is a metal rod, in this case of square cross-section, having one end of a flat spring, 41, fastened to one end of it, as shown. The other end of spring 41 is clamped between the washers 42 and 43, and this clamp is terminated at the top with a binding post 44, in order to provide an electrical connection for a wire. The spring 41 is so adjusted that the right hand end of rod 35, if free to assume its natural position would be somewhat higher than its left hand end. Actually, however, it is held down and kept practically horizontal by means of an adjusting screw 31.

Two small cubical blocks 32 and 33, fastened by means of bolts or screws to the bottom of the apparatus cabinet, are for the purpose of preventing side motion of the rod 35. Block 33 is identical with block 32 and is in back of it, being separated from it by the width of rod 35 which, as previously stated, is of square cross-section.

The lower end of a flat spring, 34 is set tightly in the rod 35 and it is preferably not quite so wide as rod 35 or strip 26. Spring 34 is also much weaker than spring 41. The upper end of spring 34 is fastened to the lower end of the metal strip 26, said metal strip being exactly as wide as the square rod 35. Near its upper end, strip 26 is bent toward the left at an angle of 90°, after which it is bent downward at an angle of 90° forming the base of the clamp which fastens the contact holder 21 in place. The sides of this clamp consist of two rectangular pieces of metal 22, 23. They are identical, and are fastened to the opposite edges of strip 26; 23 being in back of 22 and separated from it by the width of strip 26. The contact holder 21 is clamped between the rectangular piece of metal 25 and the strip 26 by means of the machine screw 24, and the sides of the clamp, 22 and 23, serve as guides to hold 21 and 25 in place while the clamp is being tightened.

Figure 5:
Fig. 5 shows the lower contact holder with the lower contact in place as seen from above, and is an enlarged view.
Figure 6:
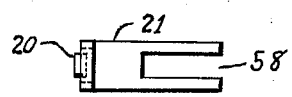
Fig. 6 shows the parts represented in Fig. 5, but as though the observer were looking toward the right hand end of Fig. 5.
Figure 7:
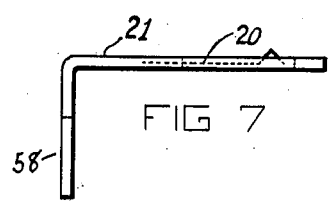
Fig. 7 shows the parts represented in Figs. 5 and 6, but as though the observer were looking toward the lower side of Fig. 5.

The construction of the lower contact holder 21 and the lower contact 20 is more clearly shown in Figs. 5, 6 and 7. Contact 20 consists of an exceedingly thin strip of metal, preferably an alloy of platinum and iridium, which at one end is bent into the shape of an inverted V. The other end of contact 20 is fastened tightly into the contact holder 21, which is slotted to receive it. Thus, contact member 20 is free to move slightly at its outer end when, during the operation of the machine, the lower end of upper contact 19 strikes the apex of the inverted V, but at the same time contact 20 is protected to a considerable extent against damage in handling by means of the surrounding metal of its holder, 21.

Referring to Fig. 6, 58 shows clearly the slot necessary in that portion of contact holder 21 which is clamped under the rectangular piece of metal 25, otherwise the screw 24 would prevent contact holder 21 from going into place. It will thus be seen that a worn out contact 20 can quickly and easily be replaced by simply inserting a new assembly consisting of contact 20 and holder 21. The upper contact 19 is preferably made of a much softer metal than lower contact 20, for example pure silver, and this contact is also easily replaced when necessary.

Referring again to Fig. 1, 29 and 30 are two vertical strips of metal which have been bent near their lower ends to an angle of 90° so that they may be bolted to the cabinet base as shown. They are identical, 30 being in back of 29 and on the opposite side of the square rod 35 and the vertical strip 26, and their inner surfaces are separated only by the width of rod 35 and strip 26. These vertical strips 29 and 30 serve both as a protection against objectionable motion of the strip 26 other than from left to right or vice-versa, and also as a support for the threaded cubical block 27, said block being attached to the inner surfaces of 29 and 30. The adjusting screw 28 passes through block 27, the point of the screw resting on strip 26 which has a tendency to move toward the right owing to the action of the spring 34. It will be seen that the lower contact 20 will be moved vertically by turning the adjusting screw 31 since the relatively strong spring 41 will cause the vertical strip 26 to slip past the point of the adjusting screw 28, and it will likewise be seen that the lower contact 20 will be moved horizontally by turning the adjusting screw 28 since the relatively weak spring 34 will provide for this and keep pressure on the point of screw 28 by the strip 26. The width of the lower contact holder 21 is the same as that of the strip 26, or it may be slightly less so that 21 will have sufficient room to pass down between the upper ends of strips 29 and 30 when adjusting screw 31 is turned so that 20 is lowered as far as possible to permit safe removal or insertion of the pendulum.

It is true that with this method of adjustment, an exceedingly slight vertical adjustment is introduced, due to translation, when a horizontal adjustment is made, and for the same reason a slight horizontal adjustment is introduced when a vertical one is made, but since the device is used for relatively small adjustments only, absolutely no objectionable effect is noticed in practical operation.

Referring to Fig. 1, it will be observed that the regulating arm, 53, extends to the bottom of the cabinet. At its lower end it passes between the strips 38 and 39 which are fastened to the bottom of the cabinet and are separated slightly so as to form a groove 61 in which the end of the regulating arm 53 can be moved back and forth. These parts are shown clearly in Fig. 10, when referred to in conjunction with Fig. 1. The strips 37 and 40 serve as stops to prevent the lower end of 53 from moving more than a short distance beyond either end of the scale 62. The longitudinal line 36, which is centrally located on the lower end of regulating arm 53, serves as an index or pointer when used in conjunction with the scale 62 which is on top of strip 38.

The device shown on the left in Fig. 1 is for the purpose of providing a fine adjustment for the regulating arm 53, so that the lower end of this arm can be readily moved back and forth over the scale 62 for shorter distances than can be conveniently executed by moving arm 53 directly. At the same time, it is always possible to move arm 53 directly over the scale 62 independently of the fine adjustment device and without interference from said device. The fine adjustment device will always be operative regardless of the position of arm 53 provided the lower end of said arm is not touching either of the stops 37 or 40.

As shown in Fig. 1, 45 is a rod, in this case of square cross-section. One end of it is clamped to the side of the cabinet, and is separated from the cabinet by means of the rectangular block, 46. The posts, of square cross-section, 47 and 48 are fastened to the side of the cabinet, 48 being in back of 47 and identical with it.

The inner surfaces of these posts are separated by the width of the square rod 45. The bridge 49, also of square cross-section, connects the top of post 47 with the top of post 48, and is fastened to them. The adjusting screw, 50, passes through the center of the bridge 49. Two metal strips 51 and 52 are attached to either side of the rod 45 at its upper end. They are exactly alike, and 52 is in back of 51. Strips 51 and 52 pass strip 53 on opposite sides, and they exert equal pressure on it from either side. Their sole purpose is to drive 53 by means of friction.

When the adjusting screw 50 is turned so as to exert pressure on rod 45, the latter will bend, and when made of proper material, will act as a relatively strong spring. If adjusting screw 50 is turned under this condition, the regulating strip or arm 53 will be moved to a slight extent over the scale 62 shown in Fig. 10, due to the pressure exerted by strips 51 and 52 on either side of arm 53. However, if arm 53 is pushed directly back and forth over scale 62, a portion of said arm will slide between strips 51 and 52, but there will be no effect on the device for fine adjustment owing to the relatively great pressure exerted by rod 45 against the end of adjusting screw 50. Nevertheless, turning adjusting screw 50 will cause arm 53 to move a relatively short distance over scale 62 regardless of the position of said arm as long as index 36 is within the limits of said scale.

Figure 11:
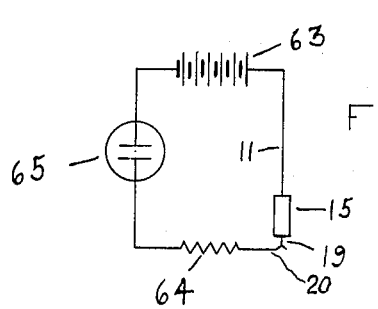
Fig. 11 is a diagrammatic view of the relatively simple electrical circuit in which the invention operates.

Referring to Fig. 11, 63 is any source of direct current, as, for example, a battery; 64 is a resistor and 65 is a neon or other gaseous discharge lamp. It will be seen that lamp 65 will flash each time contacts 19 and 20 come together due to the swinging of the pendulum, whether toward the left or the right, and the mechanical design of these contacts is such that each flash will exist for only an exceedingly short period of time.

In order to find the rate of, for example, a watch, it is necessary to bring the moving balance wheel of the watch into the proximity of the neon lamp so that it is illuminated by said lamp. The pendulum is made to swing and lower contact 20 is adjusted, by means of adjusting screw 31, to such a height that the lamp just flashes at regular intervals without interruptions. When this is the case, the lower end of upper contact 19 will just touch the apex of the inverted V at the end of lower contact 20 each time it passes said V, and it is not desirable to raise contact 20 much higher than this.

Regulating arm 53 is then moved as far as possible to the right or left until it touches stop 37 or 40. This does not interfere with, or prevent the flashing of the lamp since it does not alter the height of upper contact 19 when the pendulum is at the center of its stroke. Upon looking at the balance, a clear image of it will be seen at each flash of light as though it were not in motion. This is due to the well known stroboscopic principle. If the period of time between each two flashes of light is exactly equal to the time required for one complete cycle of the balance, then it is obvious that the arm or spoke of the balance will reappear indefinitely in the same position at each successive flash of light. In other words, it will not appear to have rotated during the interval. If, however, the period of time between each two flashes is not exactly equal to the time required for one complete balance cycle, then each successive flash of light will produce a balance image in which the spoke or arm will appear to be in a slightly different angular position from that in which it was at the preceding flash. Expressing the phenomenon differently, it will appear to have rotated in the meantime, although the rotation itself cannot actually be observed, but appears as successive "jumps" of greater or lesser magnitude at each flash, and it is only a question of time before considerable apparent rotation will have accumulated, showing the arm of the balance to be in an entirely different angular position at each flash than was the case at a previous comparison.

Actually, the balance images will imitate, on a slow scale and in jumps, the actual motion of the oscillating balance.

Returning to the method of using the device, it is assumed that since the regulator arm 53 has been moved as far as possible to one side of the scale 62, there will be considerable difference between the frequency of the light flashes and the oscillation frequency of the balance. The reason for this is that the oscillation frequency of the pendulum, which controls the frequency of the light flashes, is changed by raising or lowering post 9 as a result of moving arm 53. This, in turn, is due to the fact that the effective length of the pendulum is thus altered and also the force exerted by suspension spring 10 is changed, since the upper end of spring 10 is fastened to post 8 which is stationary.

Figure 10:
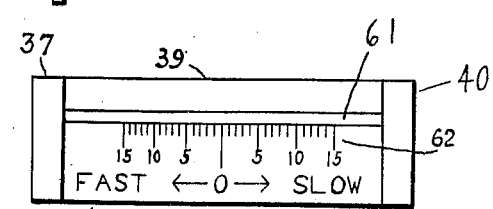
Fig. 10 shows the graduated indicating scale and associated parts as seen from above.

Returning again to the method of using the machine, it is simply necessary to wait a few seconds until the direction of rotation of the balance images has apparently reversed and proceeded for about half a revolution in the opposite direction, and when this has occurred, the arm 53 is moved toward the center of the scale until the apparent rotation of the balance images stops for about fifteen seconds, or in other words until the balance arm image has reappeared many times in the same angular position showing that no appreciable error has accumulated. Upon looking at index 36 over scale 62, the rate of gain or loss of the watch is indicated at once, since the frequency of the light flashes, which is now a known quantity, is equal to the oscillation frequency of the balance. For convenience, scale 62, instead of being calibrated in frequency, is divided so as to indicate the error of the watch directly, for the two have a definite relationship to each other. Each division on the particular scale shown in Fig. 10 represents one minute error in twenty four hours of running. When index 36 points to "0" on scale 62, the pendulum and scale are so adjusted that the watch is shown to be running correctly.

If the index points to "15" on the slow side, the watch is losing fifteen minutes per day, and if it indicates "15" on the fast side, it is gaining fifteen minutes in twenty four hours, etc. This large range, which amounts to thirty minutes in one day, is very useful in testing new hairsprings which frequently cause a large error, until corrected, when fitted to a balance.

The method of procedure outlined at the beginning of the previous paragraph is extremely accurate since the balance is near the middle of its swing, and therefore turning relatively rapidly at each flash of light with the result that error is indicated quickly, and also because error due to possible irregularity in amplitude of the swing of the balance is largely canceled out. Another reason for the high degree of accuracy is the fact that the standard used is a pendulum, and it is possible to construct pendulums having a high degree of accuracy. The accuracy of the method depends upon three things; the accuracy of the standard, of the time system and of the observer. An oscillating standard is necessary in a machine of this type if the greatest accuracy is desired.

Returning again to the operation of the instrument; if a moderately high degree of accuracy is sufficient, it is simply necessary to move the regulating arm 53 until the apparent rotation of the balance images stops, or is imperceptible, for about one half minute, whereupon the rate is read as usual on scale 62. With either this method or the previous one, a final adjustment of the regulating arm 53 may be made by means of the convenient device for fine adjustment.

When operating the instrument, it may be noticed that the images of the balance arm, instead of coming back to the same angular position at each flash, appear in two alternate positions; that is, at one flash, the image will appear in one angular position; at the next flash it will appear in a slightly different angular position and at the third flash it will be back at or near its original position.

This is caused by lower contact 20 being to one side or the other of the center of the pendulum stroke, and may be corrected by turning the adjusting screw 28 in the proper direction. Actually, it does not interfere with regulation because it is not progressive motion which always occurs when the flash frequency and oscillation frequency of the balance are not equal, and which will take place under these condtions in spite of the alternating motion, which is caused by unequal time intervals between flashes.

When the instrument is used to determine the rate of a hairspring-balance combination before said combination is placed in a watch, the same general method of operation is employed, except that it is usually more convenient to place the lamp under a sheet of glass, and in a small cabinet, in order that the light may be projected through the balance which is held on top of the glass and allowed to oscillate freely under momentum given to it by the operator while holding the hairspring at the desired point. In this case, a momentary shadow of the balance and its arm or spoke will appear at each flash of light. In this case the result is obtained by light that is transmitted directly, whereas, when the rate of a complete watch is desired, reflected light is used.

The divisions on scale 62 are not evenly spaced or "linear" due to certain characteristics of suspension spring 10, and the positions of these divisions may be determined initially by actual experiment, using a method similar to that indicated in the preceding paragraph, but with watches running at various desired rates. A better method is to establish a "0" mark in the center of the desired scale by the method outlined in the preceding paragraph, raising or lowering pendulum bob 15 if necessary in order to accomplish this result. The regulating arm is then moved to one side or the other of the "0" mark, allowed to remain in this position, and light flashes are counted until the balance of the standard watch has made exactly one more or one less complete cycle than the number of light flashes counted, or until the balance is back in the same angular position and apparently rotating in the same direction as it was at the beginning of the count. By means of a simple mathematical formula, the rate of the pendulum can then be accurately determined. A mark is then made upon the scale at the point opposite index 36, and the mark is properly numbered. In this way, any desired number of points and their corresponding frequencies may be determined upon the scale.

Once an original scale has been made, it is possible to have facsimiles of it printed in any desired quantity, and these will be sufficiently accurate provided the pendulums, suspension springs and other vital parts are made as uniformly as possible.

I am aware that stroboscopic examination of oscillating bodies associated with time systems is not new, and I am not claiming such examination broadly; but

I claim:

1. In apparatus for indicating the rate of time systems, a vertical metal supporting plate, a pendulum, a supension spring fastened to the upper end of said pendulum, means for supporting said pendulum, said means consisting of a slotted horizontal post attached to said vertical metal supporting plate, means for varying the oscillation frequency of said pendulum, said means consisting of a vertically sliding member, a second slotted horizontal post attached to said vertically sliding member, said second slotted horizontal post engaging with said pendulum suspension spring, means for limiting the motion of said vertically sliding member, said means consisting of vertical strips having grooves in which said vertically sliding member operates, said vertical strips being attached to said vertical metal supporting plate, means for actuating said vertically sliding member, said means consisting of a lever, means for determining the exact angular position of said lever, said means consisting of a graduated scale over which an index or pointer on said lever moves, a micrometer adjusting device for said lever, said device consisting of an arm fastened at one end to a support, an adjusting screw for flexing said arm slightly, a member or members for imparting said bending motion to said lever by means of the friction of said members upon said lever, said friction being insufficient to move said members or arm when said lever is moved directly and independently of said arm, means for closing an electrical circuit for exceedingly short periods of time, said means consisting of an upper electrical contact member attached to the aforesaid pendulum, said upper contact member consisting of a vertical metal strip, a lower electrical contact member not attached to said pendulum, said lower contact member consisting of a horizontal metal strip having an elevation at its free or unattached end, a holder for said lower contact member, part of said holder longitudinally surrounding said lower contact member for protection against mechanical injury, means for adjusting the vertical and horizontal positions of said lower contact member, said means consisting of a vertical arm, said lower contact holder being attached to the top of said vertical arm, an adjusting screw for varying the position of said vertical arm, a supporting member for said adjusting screw, a horizontal arm, a spring for attaching the lower end of said vertical arm to said horizontal arm, a second spring for attaching one end of said horizontal arm to a support, a second adjusting screw for varying the position of said horizontal arm, and a supporting member for said second adjusting screw.

2. In apparatus for indicating the rate of time systems, a micrometer adjusting device having an arm fastened at one end to a support, means for flexing said arm slightly, said means consisting of an adjusting screw and its support, a lever, means for imparting the motion of said bending to said lever, said means consisting of one or more members connecting the end of said arm, which is not fastened to the support, with said lever in such a manner that said member or members produce friction upon said lever so as to move it when said adjusting screw is turned, said friction being insufficient to move said members or arm when said lever is moved directly and independently of said arm.

3. In a micrometer adjusting device, an arm fastened at one end to a support, an adjusting screw for flexing said arm slightly, a lever, a member or members for imparting said bending motion to said lever by means of the friction of said members upon said lever, said friction being insufficient to move said members or arm when said lever is moved directly and independently of said arm.

4. In apparatus for indicating the rate of time systems, a pendulum, an upper electrical contact member attached to said pendulum, said upper contact member consisting of a vertical metal strip, a lower electrical contact member not attached to said pendulum, said lower contact member consisting of a horizontal metal strip having an elevation at its free or unattached end, a holder for said lower contact member, part of said holder longitudinally surrounding said lower contact member for protection against mechanical injury, means for adjusting the position of said lower contact member, said means consisting of an arm to which said lower contact holder is attached, an adjusting screw for varying the position of said arm, a supporting member for said adjusting screw, a second arm, a spring for attaching said first arm to said second arm, a second adjusting screw for varying the position of said second arm, a supporting member for said second adjusting screw, and a second spring for attaching said second arm to a support.

GEORGE B. COOK.